United States Patent
Takaoka et al.

(10) Patent No.: US 9,297,056 B2
(45) Date of Patent: Mar. 29, 2016

(54) FORGED STEEL AND WELDED STRUCTURE FOR COMPONENTS FOR NUCLEAR POWER PLANTS

(75) Inventors: Hiroyuki Takaoka, Takasago (JP); Nobuyuki Fujitsuna, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 270 days.

(21) Appl. No.: 14/001,381

(22) PCT Filed: Feb. 24, 2012

(86) PCT No.: PCT/JP2012/054620
§ 371 (c)(1),
(2), (4) Date: Aug. 23, 2013

(87) PCT Pub. No.: WO2012/115240
PCT Pub. Date: Aug. 30, 2012

(65) Prior Publication Data
US 2013/0330119 A1    Dec. 12, 2013

(30) Foreign Application Priority Data

Feb. 24, 2011 (JP) ................................. 2011-038074
Jan. 31, 2012 (JP) ................................. 2012-018488

(51) Int. Cl.
*C22C 38/44* (2006.01)
*C22C 38/46* (2006.01)
(Continued)

(52) U.S. Cl.
CPC .............. *C22C 38/001* (2013.01); *C21D 1/18* (2013.01); *C21D 8/0205* (2013.01); *C21D 8/0226* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *G21C 13/087* (2013.01); *C21D 2211/003* (2013.01); *Y02E 30/40* (2013.01); *Y10T 403/477* (2015.01)

(58) Field of Classification Search
None
See application file for complete search history.

(56) References Cited

FOREIGN PATENT DOCUMENTS

| | | |
|---|---|---|
| JP | 55 100964 | 8/1980 |
| JP | 63 53243 | 3/1988 |

(Continued)

OTHER PUBLICATIONS

"Effect of Al Rate and N Rate on Toughness of Steel Plate for Nuclear Reactor" (Toughness of A533B Steel Plate for Reactor Pressure Vessel IV)Tetsu to Hagane ,Journal of the Iron and Steel Institute of Japan , No. 11 , vol. 62 ,Sep. 1976, 7 pages. (with partial English translation).

(Continued)

*Primary Examiner* — Deborah Yee
(74) *Attorney, Agent, or Firm* — Oblon, McClelland, Maier & Neustadt, L.L.P.

(57) ABSTRACT

A forged steel for components for nuclear power plants meets a specific chemical composition. The grain size number of a metal structure thereof is 4.5 to 7.0 in terms of ASTM grain size number. It is preferred that the content of N is 0.0100 mass % or more when the mass ratio (Al/N) of the content of Al to the content of N is 1.93 or more, and that the content of Al is 0.022 mass % or more when the mass ratio (Al/N) of the content of Al to the content of N is less than 1.93. The forged steel for components for nuclear power plants exhibits excellent strength, toughness and hydrogen cracking resistance even after being subjected to a stress relief heat treatment subsequent to welding.

11 Claims, 1 Drawing Sheet

(51) Int. Cl.

| | | |
|---|---|---|
| *C22C 38/48* | (2006.01) | |
| *C22C 38/50* | (2006.01) | |
| *C22C 38/00* | (2006.01) | |
| *C21D 1/18* | (2006.01) | |
| *C21D 8/02* | (2006.01) | |
| *G21C 13/087* | (2006.01) | |
| *C22C 38/08* | (2006.01) | |
| *C22C 38/12* | (2006.01) | |
| *C22C 38/58* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/54* | (2006.01) | |

(56) References Cited

FOREIGN PATENT DOCUMENTS

| JP | 63 69944 | 3/1988 |
|---|---|---|
| JP | 64 8255 | 1/1989 |
| JP | 2000 319749 | 11/2000 |
| JP | 2001 226736 | 8/2001 |
| JP | 2002-256378 | 9/2002 |
| JP | 2003 268438 | 9/2003 |
| JP | 2006-336098 | 12/2006 |
| JP | 2008-248382 | 10/2008 |
| JP | 2009-203492 | 9/2009 |
| KR | 2001-0056461 A | 7/2001 |

OTHER PUBLICATIONS

Tetsuo Kikutake, et al., "Effect of Al and N on the Toughness of Heavy Section Steel-Plates", Tetsu to Hagane, Journal of the Iron and Steel Institute of Japan, May 1988, 11 pages (partial English translation).

Wang Bo-Zhong, et al., "Manufacturing of Nozzle Shell with Integral Flange for Nuclear Reactor Pressure Vessel", 17th International Forgemasters Meeting Santander, Spain Nov. 3-7, 2008, (p. 331~p. 336) Casting and Forging Manufacture Company Ltd., China, First Heavy Industries Tianjin Heavy Equipment Development Engineering Company, China First Heavy Industries, 2008, 10 pages.

Specification for Quenched and Tempered Vacuum-Treated Carbon and Alloy Steel Forgings for Pressure Vessels, SA-508/SA-508M, 2010 Section 2,Part A, pp. 897-906.

International Search Report Issued Apr. 24, 2012 in PCT/JP12/054620 Filed Feb. 24, 2012.

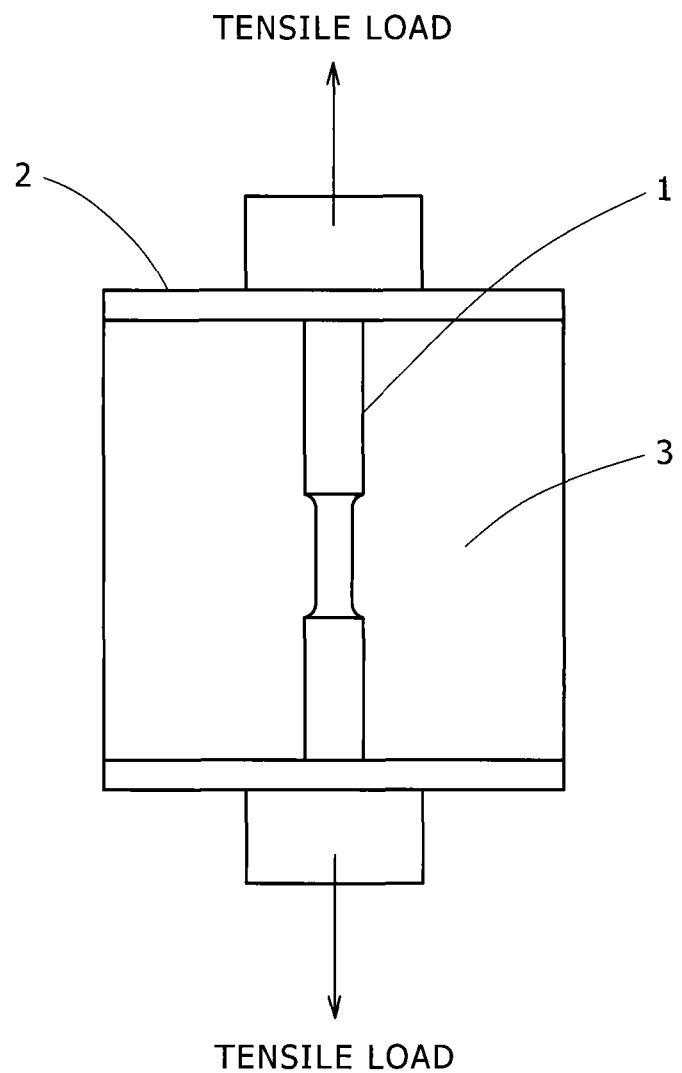

FORGED STEEL AND WELDED STRUCTURE FOR COMPONENTS FOR NUCLEAR POWER PLANTS

TECHNICAL FIELD

The present invention relates to forged steels for components for nuclear power plants, which forged steels are used as members for constituting pressure vessels, steam generators, and other equipment in nuclear power facilities. The present invention also relates to welded structures for components for nuclear power plants, which are formed by welding two or more forgings of the forged steels for components for nuclear power plants.

BACKGROUND ART

Large-sized forged steels (steel forgings) have satisfactory strength and toughness, have been regarded as suitable assembly members for pressure vessels, steam generators, and other equipment in nuclear power facilities, and have been widely used as members for components for nuclear power plants. Nuclear power generation has recently been employed more and more, because this technique is free from carbon dioxide ($CO_2$) emission and is advantageous from the viewpoints of protection in global environment and particularly prevention in global warming. In addition, more and more energy has recently been required than ever before, and this demands further larger-sized pressure vessels, steam generators, and other equipment in nuclear power facilities.

Pressure vessels, steam generators, and other equipment in nuclear power plants have had larger and larger sizes as described above. This requires large-sized forged steels for use therein to have further satisfactory strength and toughness and to exhibit satisfactory hydrogen cracking resistance (hydrogen embrittlement resistance).

Large-sized forged steels may be used as base materials (base metals) to assemble welded structures for components for nuclear power plants. Such structures after welding are generally subjected to a long-term stress relief heat treatment in order to relieve the stress. The large-sized forged steels for components for nuclear power plants should have strength and toughness at satisfactory levels even after the stress relief heat treatment.

The large-sized forged steels for components for nuclear power plants should have strength, toughness, and hydrogen cracking resistance at satisfactory levels as above. Techniques relating to steels having satisfactory strength and toughness have been proposed from long ago as in Patent Literature (PTL) 1 to 4. Nuclear power plants in those times, however, were designed before the upsizing and required strength and toughness at not so high levels as compared to those of current large-sized equipment.

Improvements in hydrogen cracking resistance have been studied both from steel refining techniques and from steel chemical compositions and structures. In view of the refining techniques, real operations have already employed a specific technique. In this epoxy resin composition, the upper limit of a hydrogen level upon molten steel refining is specified, and a hydrogen gas removing treatment is performed when an actual hydrogen level exceeds the specified upper limit. The hydrogen gas removing treatment is believed to have a ceiling in hydrogen reduction from the viewpoints of treatment time and cost. For these reasons, current production of forged steels employs control of hydrogen on the order of from one to several parts per million. The current hydrogen control on the order of from one to several parts per million, however, fails to completely prevent hydrogen cracking because hydrogen cracking is caused by hydrogen at a lower level than this.

From the viewpoints of steel chemical compositions and structures, PTL 5 has proposed a technique for improving hydrogen cracking resistance as a method for refining a molten steel. In this technique, MnS inclusions are positively introduced into the steel by increasing a S content in the steel, and the MnS inclusions are effectively used as diffusible-hydrogen trapping sites. Although certainly improving hydrogen cracking resistance, even this technique hardly prevents hydrogen cracking completely. This technique disadvantageously causes deterioration in toughness due to inclusions in larger amounts, although it provides somewhat better hydrogen cracking resistance.

CITATION LIST

Patent Literature

PTL 1: Japanese Unexamined Patent Application Publication (JP-A) No. S55-100964
PTL 2: JP-A No. S63-53243
PTL 3: JP-A No. S63-69944
PTL 4: JP-A No. S64-8255
PTL 5: JP-A No. 2003-268438

SUMMARY OF INVENTION

Technical Problem

The present invention has been made to solve the disadvantages of customary techniques, and an object thereof is to provide a forged steel for components for nuclear power plants, which forged steel has strength, toughness, and hydrogen cracking resistance at satisfactory levels even after a stress relief heat treatment subsequent to welding. Another object of the present invention is to provide a welded structure for components for nuclear power plants, which welded structure is obtained by welding two or more forgings of the forged steel for components for nuclear power plants.

Solution to Problem

The present invention provides a forged steel for components for nuclear power plants, including: C in a content of from 0.15% to 0.24%; Si in a content of from 0.15% to 0.30%; Mn in a content of from 1.0% to 1.6%; P in a content of from greater than 0% to 0.015%; S in a content of from greater than 0% to 0.0015%; Cu in a content of from 0% to 0.10%; Ni in a content of from 0.70% to 1.10%; Cr in a content of from 0.05% to 0.30%; Mo in a content of from 0.40% to 0.60%; V in a content of from 0% to 0.05%; Al in a content of from 0.015% to 0.030%; O in a content of from greater than 0% to 0.0030%; N in a content of from 0.0050% to 0.0150%, in mass percent, in which the forged steel further includes iron and inevitable impurities; and a metal structure of the forged steel has a grain size in terms of ASTM grain size number of from 4.5 to 7.0 (first embodiment).

In the forged steel for components for nuclear power plants according to the first embodiment, the content of N may be 0.0100% or more in mass percent when a mass ratio (Al/N) of the content of Al to the content of N is 1.93 or more; and the content of Al may be 0.022% or more in mass percent when the mass ratio (Al/N) is less than 1.93 (second embodiment).

In the forged steel for components for nuclear power plants according to the first or second embodiment, the forged steel has a large size; and cementite present in the metal structure of the forged steel has an average equivalent circle diameter of 0.5 μm or less (third embodiment).

The forged steel for components for nuclear power plants according to any one of the first, second, and third embodiments may further include at least one element selected from the group consisting of Nb in a content of from 0.005% to 0.050%; Ti in a content of from 0.005% to 0.030%; B in a content of from 0.0005% to 0.0050%; and Ca in a content of from 0.0005% to 0.0050%, in mass percent.

The present invention further provides, in a fifth embodiment, a welded structure obtained by preparing two or more forgings of the forged steel of any one of the first, second, third, and fourth embodiments; and welding the two or more forgings with each other.

Advantageous Effects of Invention

The forged steel and welded structure for components for nuclear power plants according to the present invention have strength, toughness, and hydrogen cracking resistance at satisfactory levels even after a stress relief heat treatment subsequent to welding.

BRIEF DESCRIPTION OF DRAWINGS

FIG. 1 is a front view illustrating how to perform a slow strain rate test (SSRT) to evaluate hydrogen cracking resistance in experimental examples.

DESCRIPTION OF EMBODIMENTS

Large-sized forged steels (steel forgings) may be used as base metals to assemble welded structures for components for nuclear power plants. Such structures after welding are generally subjected to a long-term stress relief heat treatment to relieve the stress. Customary as-forged steels for components for nuclear power plants have strength and toughness at certain levels in themselves, but the strength, toughness, and hydrogen cracking resistance of those after a stress relief heat treatment are not specifically investigated. Under these circumstances, the present inventors made various intensive investigations to develop forged steels and welded structures for components for nuclear power plants, which have strength, toughness, and hydrogen cracking resistance at satisfactory levels even after a stress relief heat treatment.

According to the customary technique, hydrogen cracking resistance of a forged steel is improved by increasing a S content in the steel to positively introduce MnS inclusions into the steel, and effectively using the MnS inclusions as diffusible-hydrogen trapping sites. The hydrogen cracking resistance of the resulting forged steel, however, is still insufficient. The present inventors made investigations to find a forged steel having hydrogen cracking better than that of the customary forged steel. As a result, the present inventors have found that reduction in S content in a steel contrarily gives a forged steel having better hydrogen cracking resistance. While reasons and mechanism remain still unclear, the better hydrogen cracking resistance is obtained probably because MnS inclusions are formed in a smaller amount to reduce stress concentration occurring at the interface between the MnS inclusions and the matrix.

The present inventors have also found that the control of a forged steel to have a metal structure having a grain size larger than usual is effective to suppress the formation of pseudo-polygonal ferrite and granular bainite; and have found that this gives a forged steel and a welded structure for components for nuclear power plants, which have strength, toughness, and hydrogen cracking resistance at satisfactory levels even after a stress relief heat treatment. The present invention has been made based on these findings.

The present inventors have further found that control of the amount of aluminum nitride (AlN) precipitates advantageously provides toughness and hydrogen cracking resistance at further satisfactory levels. They have found that refinement of cementite in the metal structure provides further better toughness.

The present invention will be illustrated in detail below, with reference to embodiments thereof.

The present invention essentially specifies the chemical compositions of a forged steel and the grain size of its metal structure. Initially, the chemical compositions will be illustrated in detail below. All percentages for contents of respective elements (chemical compositions) are in mass percent.

Chemical Compositions

C: 0.15% to 0.24%

Carbon (C) element is essential for ensuring strength at certain level. Carbon present in a content of less than 0.15% may fail to contribute to necessary strength. In contrast, carbon present in a content of greater than 0.24% may cause increase in hard phases such as martensite and cause the forged steel to have inferior toughness. To prevent these, the carbon content may be from 0.15% to 0.24%. The carbon content is preferably 0.17% or more in terms of its lower limit; and is preferably 0.22% or less and more preferably 0.20% or less in terms of its upper limit.

Si: 0.15% to 0.30%

Silicon (Si) element effectively contributes to better strength as with carbon. Although even a trace amount of Si may contribute to better strength, the Si content herein is specified to be 0.15% or more in terms of its lower limit. In contrast, Si in an excessively high content may cause excessively high strength and increase in hard phases such as martensite to cause inferior toughness. To prevent this, the Si content is specified to be 0.30% or less; and is preferably 0.27% or less and more preferably 0.25% or less in terms of its upper limit.

Mn: 1.0% to 1.6%

Manganese (Mn) element effectively contributes to better strength and toughness. Mn present in a content of less than 1.0% may exhibit insufficient effects. In contrast, Mn present in an excessively high content may cause excessively high strength, increase in hard phases such as martensite, and coarsening of grain boundary carbides to cause deterioration in strength and toughness. To prevent these, the Mn content may be from 1.0% to 1.6%. The Mn content is preferably 1.2% or more in terms of its lower limit; and is preferably 1.5% or less in terms of its upper limit.

P: greater than 0% to 0.015%

Phosphorus (P) element is an inevitably contaminated impurity and adversely affects toughness. To prevent this, the phosphorus content is preferably minimized. From this viewpoint, the phosphorus content should be controlled to 0.015% or less and is preferably 0.010% or less. However, it is industrially difficult to control the phosphorus content in the steel to 0%.

S: greater than 0% to 0.0015%

Sulfur (S) element forms MnS and impairs hydrogen cracking resistance. To prevent this, the content of sulfur is preferably minimized. From this viewpoint, the sulfur content should be controlled to be 0.0015% or less, and is preferably 0.0013% or less, and more preferably 0.0012% or less.

However, it is industrially difficult to control the sulfur content in the steel to 0%.

Cu: 0% to 0.10%

Copper (Cu) element effectively contributes to higher strength and better toughness and is added according to necessity. Cu present in an excessively high content, however, may cause excessively high strength and increase in hard phases such as martensite and impair strength and toughness. To prevent this, the Cu content should be 0.10% or less, and is preferably 0.05% or less in terms of its upper limit.

Ni: 0.70% to 1.10%

Nickel (Ni) element effectively contributes to higher strength and better toughness. Ni present in a content of less than 0.70% may exhibit insufficient effects. In contrast, Ni present in an excessively high content may cause excessively high strength to adversely affect toughness. To prevent these, the Ni content may be from 0.70% to 1.10%. The Ni content is preferably 0.80% or more in terms of its lower limit; and is preferably 1.05% or less, and more preferably 1.00% or less in terms of its upper limit.

Cr: 0.05% to 0.30%

Chromium (Cr) element contributes to higher strength and better toughness. Cr present in a content of less than 0.05% may exhibit insufficient effects. In contrast, Cr present in an excessively high content may cause coarsening of grain boundary carbides to adversely affect strength and toughness. To prevent these, the Cr content may be from 0.05% to 0.30%. The Cr content is preferably 0.10% or more in terms of its lower limit; and is preferably 0.27% or less, and more preferably 025% or less in terms of its upper limit.

Mo: 0.40% to 0.60%

Molybdenum (Mo) element contributes to higher strength and better toughness. To exhibit the activities effectively, the Mo content should be 0.40% or more. The Mo content is preferably 0.45% or more, and more preferably 0.50% or more in terms of its lower limit. In contrast, Mo present in an excessively high content may cause coarsening of grain boundary carbides to adversely affect toughness. To prevent this, the Mo content should be 0.60% or less, and is preferably 0.55% or less in terms of its upper limit.

V: 0% to 0.05%

Vanadium (V) element effectively contributes to higher strength and better toughness and is added according to necessity. Vanadium present in excessively high content may cause coarsening of oxides to adversely affect toughness. To prevent this, the vanadium content should be 0.05% or less, and is preferably 0.03% or less in terms of its upper limit.

Al: 0.015% to 0.030%

Aluminum (Al) element serves as a deoxidizer and effectively reduces the oxygen content. To exhibit the activities effectively, Al should be contained in a content of 0.015% or more. Al present in an excessively high content, however, may cause coarsening of oxides and adversely affect toughness contrarily. To prevent this, the Al content should be controlled to 0.030% or less.

O: greater than 0% to 0.0030%

Oxygen (O) element forms oxides and impair toughness. To prevent this, the oxygen content is preferably minimized, except in the ease of inevitable contamination. The oxygen content is therefore 0.0030% or less, preferably 0.0020% or less, and more preferably 0.0015% or less.

N: 0.0050% to 0.0150%

Nitrogen (N) element forms carbonitrides with Al or optionally added Nb, Ti, and/or V to contribute to better toughness. To exhibit the activities effectively, nitrogen should be contained in a content of 0.0050% or more. However, nitrogen present in an excessively high content may serve as solute nitrogen and cause strain aging to adversely affect toughness. To prevent this, the nitrogen content should be 0.0150% or less in terms of its upper limit.

Elements to be contained in the forged steel specified in the present invention are as above. The forged steel may further contain iron and inevitable impurities. Elements such as Sn, As, and Pb may be brought into the forged steel from raw materials, construction materials, and manufacturing facilities. These elements may be contained as the inevitable impurities. The forged steel may further positively effectively contain one or more elements as follows. The resulting forged steel can have a better property or properties according to the type of an element (chemical composition) to be additionally contained.

Nb: 0.005% to 0.050%

Niobium (Nb) element advantageously contributes to better hardenability and higher strength. Nb present in an excessively high content, however, causes large amounts of carbides to adversely affect toughness. The content of Nb, when added, may be 0.050% or less and preferably 0.040% or less. To exhibit the above activities effectively, Nb is preferably contained in a content of 0.005% or more.

Ti: 0.005% to 0.030%

Titanium (Ti) element forms TiN that is finely dispersed in the steel to advantageously prevent coarsening of austenite grains during heating. To exhibit the activities effectively, Ti is preferably contained in a content of 0.005% or more. Ti present in an excessively high content, however, may adversely affect weldability. To prevent this, the content of Ti, when contained, is preferably 0.030% or less.

B: 0.0005% to 0.0050%

Boron (B) element advantageously contributes to better hardenability and higher strength. Boron present in an excessively high content, however, may form a coarse structure and adversely affect toughness. The content of boron, when contained, is preferably 0.0050% or less, more preferably 0.0040% or less, and furthermore preferably 0.0020% or less. To exhibit the above activities effectively, boron is preferably contained in a content of 0.0005% or more.

Ca: 0.0005% to 0.0050%

Calcium (Ca) element controls the forms of sulfides and contributes to better toughness. Ca present in an excessively high content of greater than 0.0050%, however, may contrarily impair toughness. To exhibit the above activities effectively, Ca is preferably contained in a content of 0.0005% or more.

Grain Size of Metal Structure

In addition to having the chemical compositions, the forged steel according to the present invention should include a metal structure having a grain size in terms of ASTM grain size number of from 4.5 to 7.0. The forged steel according to the present invention has a metal structure mainly including a bainitic structure. The metal structure herein is controlled to have a grain size in terms of ASTM grain size number of from 4.5 to 7.0. This reduces the percentage of pseudo-polygonal ferrite and granular bainite in the bainitic structure after transformation regardless of the cooling rate. This allows the forged steel to have strength and toughness at satisfactory levels even after a stress relief heat treatment.

Mass Ratio of the Content of Al to the Content of N

A forged steel for components for nuclear power plants, when satisfying the conditions for the chemical compositions and metal structure grain size, can have strength, toughness, and hydrogen cracking resistance at satisfactory levels even after a stress relief heat treatment subsequent to welding. In a preferred embodiment, the forged steel further satisfies conditions for the mass ratio (Al/N) of the content of Al to the content of N as follows. The forged steel according to this embodiment has a higher degree of grain size regulation of the metal structure and can have toughness and hydrogen cracking resistance at further higher levels.

Specifically, the nitrogen content is 0.0100% in mass or more when the mass ratio (Al/N) is 1.93 or more; and the Al content is 0.022% in mass or more when the mass ratio (Al/N) is less than 1.93.

Cementite Refinement

Refinement of cementite in the metal structure in addition to the control of metal structure grain size contributes to further better balance between strength and toughness. Specifically, the cementite preferably has an average equivalent circle diameter of 0.5 μm or less.

Manufacturing Conditions

A forged steel according to an embodiment of the present invention can be manufactured by preparing a steel having chemical compositions satisfying the above conditions; and forging the steel according to a common procedure. For example, the forging may be performed at a heating temperature of 1000° C. to 1300° C. and at any working ratio. Heating in quenching, however, should be performed at a temperature of from 880° C. to lower than 1000° C. Cooling in quenching may be performed at a cooling rate of about 10° C./min or more. Tempering may be performed under regular conditions at a temperature of around 650° C. A stress relief heat treatment may be performed under regular conditions at a temperature of around 600° C.

The heating in quenching is performed at a temperature of 880° C. or higher so as to control the metal structure to have a grain size in terms of ASTM grain size number of 4.5 or more. The heating in quenching is performed at a temperature of lower than 1000° C. so as to the metal structure to have a grain size in terms of ASTM grain size number of 7.0 or less.

To obtain the fine cementite, the tempering time should be shorter than that in customary techniques. In the customary techniques, it is generally considered that dislocation density (strength) decreases and toughness thereby increases with an elongating tempering time. However, after investigations, the present inventors have found that when the tempering time is shortened contrarily, the strength increases, but toughness is further remarkably effectively improved due to cementite refinement. This probably results in better balance between strength and toughness.

In regular customary procedures, tempering is generally performed for a time of from longer than about 10 hours to about 15 hours. In the present invention, tempering is performed for a shorter time of from 5 hours to 10 hours to improve balance between strength and toughness.

Examples

The present invention will be illustrated in further detail with reference to several experimental examples below. It should be noted, however, that the examples are by no means construed to limit the scope of the invention; and various changes and modifications without departing from the spirit and scope of the invention are possible and fall within the scope of the invention.

In an experimental example of the present invention, steels (20 tons) having chemical compositions given in Tables 1 and 2 were melted, heated at 1200° C., applied with a working strain of 15%, and yielded sheet samples (forged steels). Quenching and tempering were performed under conditions as given in Tables 3 and 4. Relating to the tempering time, tempering on Samples Nos. 11 to 24 was performed for 12 hours; and tempering on the other samples, i.e., Samples Nos. 1 to 10 and 31 to 62 was performed for 10.5 hours. The testing samples were each subjected to a stress relief heat treatment at a heating temperature of 607° C. for a holding time of 48 hours.

In another experimental example, how the tempering time affects was examined. The results are indicated in Tables 5 and 6. Sample forged steels were obtained by the steps as in the above experimental example.

Grain Size Number Measurement

A 20-mm square specimen was sampled from each sheet sample (forged steel) at a depth of one-fourth the sheet thickness from the surface in a direction perpendicular to the rolling direction. The specimen was polished on its surface, and the grain size number thereof was measured by the grain size quantitative determination method prescribed in Japanese Industrial Standard (JIS) G 0551.

Cementite Grain Size Measurement

The grain size of cementite was quantitatively determined in the Mowing manner. The specimen sampled for grain size number measurement was again subjected to surface polishing, etched with a Nital solution, and the microstructure of which was analyzed in observation under a scanning electron microscope (SEM). In addition, an image of the microstructure was taken at a 4000-fold magnification in an area of 30 μm by 30 μm per field of view, regions of cementite appearing white in the microstructure image was copies to a transparent film, and an average size of the cementite grains was quantitatively determined as an average equivalent circle diameter using the image analyzer Image-Pro-Plus.

Yield Strength and Tensile Strength Evaluation

A standard size specimen as specified in ASTM SA-370 was sampled from each sheet sample (forged steel) at a depth of one-fourth the sheet thickness from the surface in a direction perpendicular to the rolling direction. The specimen was subjected to a tensile test as specified in JIS Z 2241 to measure and determine a yield strength (YS) in the rolling direction and a tensile strength (TS) of the specimen. In this experimental example, a sample having a TS of 550 MPa or more was evaluated as a forged steel having satisfactory strength. The measurement results are indicated in Tables 3 and 4.

Toughness Evaluation

Three Charpy impact specimens (JIS Z 2201 Number 4 specimens) were sampled from each sheet sample (forged steel) at a depth of one-fourth the sheet thickness from the surface so that the axis of each specimen pass through the depth of one-fourth the sheet thickness. The specimens were subjected to Charpy impact tests to measure absorbed energy, and the three measured values of absorbed energy were averaged. A temperature ($vE_{100}$) at which the average absorbed energy be 100 J was defined as toughness of each forged steel sample. In this experimental example, a sample having a $vE_{100}$ of −5° C. or lower, when having a TS of 650 MPa or more, was evaluated as a forged steel having satisfactory toughness; whereas a sample having a $vE_{100}$ of −20° C. or lower, when having a TS of less than 650 MPa, was evaluated as a forged steel having satisfactory toughness. The measurement results are indicated in Tables 3 and 4.

Hydrogen Cracking Resistance Evaluation

A round rod specimen was sampled from each sheet sample (forged steel) at a depth of one-fourth the sheet thickness from the surface so that the axis of the specimen pass through the depth of one-fourth the sheet thickness. The sampled specimen was worked into a dumbbell specimen having a length of 150 mm and a gauge length of 10 mm. The dumbbell specimen was worked so that the central part thereof have a diameter of 4 mm, and both ends have a diameter of 8 mm to form grippers, followed by providing screws over a length of 15 mm.

The hydrogen cracking resistance was evaluated by subjecting the specimen to a comparative test on hydrogen cracking susceptibility of steels for forging.

Initially, with reference to FIG. 1, each specimen 1 was set to test equipment 2 and immersed in an aqueous solution 3. The aqueous solution 3 contained 0.5 Mol/L $H_2SO_4$ and 0.01 Mol/L KSCN. In this state, cathodic electrolysis was performed at a current density of 0.5 $A/dm^2$ while supplying hydrogen to the testing system. After the completion of this preparation, the specimen 1 was subjected to a slow strain rate test (SSRT) in which a tensile load was applied longitudinally to the specimen 1, and a stress S1 (elongation) of the specimen was measured. This test was performed at a crosshead tensile speed of the test equipment 2 of $2\times10^{-3}$ mm.

Another slow strain rate test (SSRT) was performed by the above conditions, except for omitting immersion in the aqueous solution 3, i.e., except for performing the test in the atmosphere, and a rupture stress S2 was measured by the above procedure.

The measured values obtained in the measurements were substituted into an expression to determine a hydrogen cracking susceptibility S-value, the expression expressed as follows:

$$s\text{-value}=(1-S2/S1)\times100$$

Hydrogen cracking resistance of each specimen was evaluated based on the determined S-value according to criteria as follows. A sample evaluated as excellent or good was evaluated as a forged steel having satisfactory hydrogen cracking resistance. The evaluation results are indicated in Tables 3 and 4.

Excellent: Sample having an S-value of less than 30 is evaluated as having very good hydrogen cracking resistance;

Good: Sample having an S-value of from 30 to 40 is evaluated as having good hydrogen cracking resistance;

Fair: Sample having an S-value of from 40 to 50 is evaluated as having somewhat poor hydrogen cracking resistance; and Poor: Sample having an S-value of 50 or more is evaluated as having poor hydrogen cracking resistance.

TABLE 1

| No. | C | Si | Mn | P | S | Cu | Ni | Cr | Mo | V | Al | N | O | Nb | Ti | B | Ca | Al/N |
|---|---|---|---|---|---|---|---|---|---|---|---|---|---|---|---|---|---|---|
| 1 | 0.18 | 0.24 | 1.40 | 0.007 | 0.0003 | | 0.80 | 0.12 | 0.49 | 0.003 | 0.016 | 0.0060 | 0.0018 | | | | | 2.67 |
| 2 | 0.18 | 0.24 | 1.40 | 0.007 | 0.0010 | 0.04 | 0.80 | 0.12 | 0.49 | | 0.018 | 0.0075 | 0.0023 | | | | | 2.40 |
| 3 | 0.19 | 0.24 | 1.40 | 0.007 | 0.0011 | 0.03 | 0.80 | 0.12 | 0.49 | | 0.020 | 0.0090 | 0.0020 | | | | | 2.22 |
| 4 | 0.18 | 0.24 | 1.40 | 0.007 | 0.0009 | | 0.80 | 0.12 | 0.50 | | 0.021 | 0.0120 | 0.0022 | | | | | 1.75 |
| 5 | 0.18 | 0.24 | 1.40 | 0.007 | 0.0012 | 0.03 | 0.80 | 0.12 | 0.49 | 0.004 | 0.024 | 0.0080 | 0.0018 | | | | | 3.00 |
| 6 | 0.18 | 0.24 | 1.40 | 0.007 | 0.0012 | | 0.80 | 0.12 | 0.49 | | 0.016 | 0.0060 | 0.0020 | | | | | 2.67 |
| 7 | 0.18 | 0.24 | 1.40 | 0.007 | 0.0010 | | 0.80 | 0.12 | 0.49 | | 0.018 | 0.0075 | 0.0020 | | | | | 2.40 |
| 8 | 0.18 | 0.24 | 1.40 | 0.007 | 0.0011 | 0.02 | 0.80 | 0.12 | 0.50 | | 0.020 | 0.0090 | 0.0019 | | | | | 2.22 |
| 9 | 0.18 | 0.24 | 1.40 | 0.007 | 0.0004 | 0.03 | 0.80 | 0.12 | 0.49 | 0.005 | 0.020 | 0.0120 | 0.0020 | | | | | 1.67 |
| 10 | 0.18 | 0.24 | 1.40 | 0.007 | 0.0003 | | 0.80 | 0.12 | 0.49 | | 0.024 | 0.0120 | 0.0024 | | | | | 2.00 |
| 11 | 0.21 | 0.26 | 1.42 | 0.009 | 0.0003 | 0.03 | 0.96 | 0.22 | 0.55 | | 0.016 | 0.0060 | 0.0018 | | | | | 2.67 |
| 12 | 0.20 | 0.26 | 1.42 | 0.009 | 0.0010 | | 0.96 | 0.22 | 0.54 | | 0.018 | 0.0075 | 0.0023 | | | | | 2.40 |
| 13 | 0.20 | 0.26 | 1.42 | 0.009 | 0.0011 | | 0.96 | 0.22 | 0.54 | 0.002 | 0.020 | 0.0090 | 0.0020 | | | | | 2.22 |
| 14 | 0.20 | 0.26 | 1.42 | 0.009 | 0.0009 | 0.02 | 0.96 | 0.22 | 0.55 | | 0.021 | 0.0120 | 0.0022 | | | | | 1.75 |
| 15 | 0.20 | 0.26 | 1.42 | 0.009 | 0.0012 | | 0.96 | 0.22 | 0.54 | | 0.024 | 0.0080 | 0.0018 | | | | | 3.00 |
| 16 | 0.20 | 0.26 | 1.42 | 0.009 | 0.0012 | | 0.96 | 0.22 | 0.54 | 0.004 | 0.016 | 0.0060 | 0.0020 | | | | | 2.67 |
| 17 | 0.20 | 0.26 | 1.42 | 0.009 | 0.0010 | 0.01 | 0.96 | 0.22 | 0.55 | | 0.018 | 0.0075 | 0.0020 | | | | | 2.40 |
| 18 | 0.20 | 0.26 | 1.42 | 0.009 | 0.0011 | | 0.96 | 0.22 | 0.54 | | 0.020 | 0.0090 | 0.0019 | | | | | 2.22 |
| 19 | 0.21 | 0.26 | 1.42 | 0.009 | 0.0004 | | 0.96 | 0.22 | 0.54 | | 0.022 | 0.0120 | 0.0020 | | | | | 1.83 |
| 20 | 0.20 | 0.26 | 1.42 | 0.009 | 0.0003 | 0.03 | 0.96 | 0.22 | 0.54 | 0.005 | 0.024 | 0.0080 | 0.0024 | | | | | 3.00 |
| 21 | 0.20 | 0.26 | 1.42 | 0.009 | 0.0009 | 0.03 | 0.96 | 0.22 | 0.54 | 0.002 | 0.020 | 0.0060 | 0.0020 | 0.007 | | | | 3.33 |
| 22 | 0.21 | 0.26 | 1.42 | 0.009 | 0.0009 | | 0.96 | 0.22 | 0.54 | | 0.020 | 0.0060 | 0.0018 | | 0.008 | | | 3.33 |
| 23 | 0.20 | 0.26 | 1.42 | 0.009 | 0.0008 | 0.04 | 0.96 | 0.22 | 0.55 | | 0.020 | 0.0060 | 0.0020 | | | 0.0010 | | 3.33 |
| 24 | 0.20 | 0.26 | 1.42 | 0.009 | 0.0008 | | 0.96 | 0.22 | 0.54 | | 0.020 | 0.0060 | 0.0022 | | | | 0.0015 | 3.33 |

TABLE 2

| No. | C | Si | Mn | P | S | Cu | Ni | Cr | Mo | V | Al | N | O | Nb | Ti | B | Ca | Al/N |
|---|---|---|---|---|---|---|---|---|---|---|---|---|---|---|---|---|---|---|
| 31 | 0.14 | 0.24 | 1.40 | 0.007 | 0.0015 | | 0.80 | 0.12 | 0.49 | | 0.020 | 0.0080 | 0.0030 | | | | | 2.50 |
| 32 | 0.25 | 0.24 | 1.42 | 0.007 | 0.0015 | | 0.80 | 0.12 | 0.49 | | 0.020 | 0.0080 | 0.0030 | | | | | 2.50 |
| 33 | 0.18 | 0.13 | 1.40 | 0.006 | 0.0014 | | 0.81 | 0.11 | 0.49 | | 0.020 | 0.0080 | 0.0030 | | | | | 2.50 |
| 34 | 0.19 | 0.32 | 1.39 | 0.007 | 0.0015 | | 0.80 | 0.12 | 0.51 | | 0.020 | 0.0080 | 0.0030 | | | | | 2.50 |
| 35 | 0.18 | 0.25 | 0.90 | 0.007 | 0.0013 | | 0.80 | 0.12 | 0.49 | | 0.020 | 0.0080 | 0.0030 | | | | | 2.50 |
| 36 | 0.18 | 0.24 | 1.70 | 0.005 | 0.0015 | | 0.78 | 0.10 | 0.49 | | 0.020 | 0.0080 | 0.0030 | | | | | 2.50 |
| 37 | 0.19 | 0.22 | 1.40 | 0.017 | 0.0015 | | 0.80 | 0.12 | 0.50 | | 0.020 | 0.0080 | 0.0030 | | | | | 2.50 |
| 38 | 0.18 | 0.24 | 1.40 | 0.007 | 0.0017 | | 0.80 | 0.12 | 0.49 | | 0.020 | 0.0080 | 0.0030 | | | | | 2.50 |
| 39 | 0.18 | 0.23 | 1.40 | 0.007 | 0.0020 | | 0.82 | 0.13 | 0.50 | | 0.020 | 0.0080 | 0.0030 | | | | | 2.50 |
| 40 | 0.18 | 0.24 | 1.40 | 0.005 | 0.0015 | 0.13 | 0.80 | 0.12 | 0.49 | | 0.020 | 0.0080 | 0.0030 | | | | | 2.50 |
| 41 | 0.17 | 0.24 | 1.40 | 0.007 | 0.0015 | | 0.65 | 0.12 | 0.50 | | 0.020 | 0.0080 | 0.0030 | | | | | 2.50 |
| 42 | 0.18 | 0.21 | 1.42 | 0.007 | 0.0015 | | 1.20 | 0.12 | 0.49 | | 0.020 | 0.0080 | 0.0030 | | | | | 2.50 |
| 43 | 0.18 | 0.25 | 1.40 | 0.007 | 0.0015 | | 0.80 | 0.03 | 0.49 | | 0.020 | 0.0080 | 0.0030 | | | | | 2.50 |
| 44 | 0.18 | 0.24 | 1.39 | 0.005 | 0.0015 | | 0.80 | 0.35 | 0.49 | | 0.020 | 0.0080 | 0.0030 | | | | | 2.50 |
| 45 | 0.19 | 0.22 | 1.40 | 0.006 | 0.0014 | | 0.81 | 0.12 | 0.45 | | 0.020 | 0.0080 | 0.0030 | | | | | 2.50 |
| 46 | 0.18 | 0.24 | 1.40 | 0.007 | 0.0015 | | 0.80 | 0.11 | 0.65 | | 0.020 | 0.0080 | 0.0030 | | | | | 2.50 |
| 47 | 0.18 | 0.25 | 1.40 | 0.007 | 0.0013 | | 0.80 | 0.12 | 0.49 | 0.060 | 0.020 | 0.0080 | 0.0030 | | | | | 2.50 |
| 48 | 0.18 | 0.24 | 1.40 | 0.005 | 0.0015 | | 0.78 | 0.12 | 0.49 | | 0.012 | 0.0080 | 0.0030 | | | | | 1.50 |
| 49 | 0.17 | 0.22 | 1.40 | 0.007 | 0.0015 | | 0.80 | 012 | 0.51 | | 0.033 | 0.0080 | 0.0030 | | | | | 4.13 |
| 50 | 0.18 | 0.24 | 1.42 | 0.006 | 0.0014 | | 0.80 | 0.12 | 0.49 | | 0.020 | 0.0046 | 0.0030 | | | | | 4.35 |

TABLE 2-continued

| No. | C | Si | Mn | P | S | Cu | Ni | Cr | Mo | V | Al | N | O | Nb | Ti | B | Ca | Al/N |
|---|---|---|---|---|---|---|---|---|---|---|---|---|---|---|---|---|---|---|
| 51 | 0.18 | 0.23 | 1.40 | 0.007 | 0.0015 |  | 0.82 | 0.10 | 0.49 |  | 0.020 | 0.0153 | 0.0030 |  |  |  |  | 1.31 |
| 52 | 0.18 | 0.24 | 1.39 | 0.007 | 0.0013 |  | 0.80 | 0.12 | 0.50 |  | 0.020 | 0.0080 | 0.0032 |  |  |  |  | 2.50 |
| 53 | 0.18 | 0.24 | 1.40 | 0.005 | 0.0015 |  | 0.80 | 0.12 | 0.49 |  | 0.020 | 0.0080 | 0.0030 | 0.060 |  |  |  | 2.50 |
| 54 | 0.18 | 0.21 | 1.40 | 0.007 | 0.0015 |  | 0.80 | 0.13 | 0.50 |  | 0.020 | 0.0080 | 0.0030 |  | 0.060 |  |  | 2.50 |
| 55 | 0.18 | 0.24 | 1.40 | 0.007 | 0.0015 |  | 0.80 | 0.12 | 0.49 |  | 0.020 | 0.0080 | 0.0030 |  |  | 0.0060 |  | 2.50 |
| 56 | 0.18 | 0.24 | 1.40 | 0.007 | 0.0015 |  | 0.80 | 0.12 | 0.50 |  | 0.020 | 0.0080 | 0.0030 |  |  |  | 0.0040 | 2.50 |
| 57 | 0.18 | 0.24 | 1.40 | 0.007 | 0.0015 |  | 0.80 | 0.12 | 0.49 |  | 0.020 | 0.0080 | 0.0030 |  |  |  |  | 2.50 |
| 58 | 0.18 | 0.25 | 1.42 | 0.007 | 0.0015 |  | 0.79 | 0.12 | 0.50 |  | 0.020 | 0.0080 | 0.0030 |  |  |  |  | 2.50 |
| 59 | 0.18 | 0.24 | 1.40 | 0.007 | 0.0014 |  | 0.80 | 0.11 | 0.49 |  | 0.020 | 0.0080 | 0.0030 |  |  |  |  | 2.50 |
| 60 | 0.19 | 0.22 | 1.39 | 0.007 | 0.0015 |  | 0.78 | 0.12 | 0.49 |  | 0.020 | 0.0080 | 0.0030 |  |  |  |  | 2.50 |
| 61 | 0.18 | 0.24 | 1.40 | 0.007 | 0.0024 |  | 0.80 | 0.13 | 0.50 |  | 0.020 | 0.0080 | 0.0030 |  |  |  |  | 2.50 |
| 62 | 0.18 | 0.23 | 1.40 | 0.007 | 0.0031 |  | 0.80 | 0.12 | 0.49 |  | 0.020 | 0.0080 | 0.0030 |  |  |  |  | 2.50 |

TABLE 3

| | Manufacturing method | | | | | | | |
|---|---|---|---|---|---|---|---|---|
| | Quenching | | | | Yield | Tensile | | Hydrogen |
| No. | Heating temperature ° C. | Cooling rate ° C./min | Tempering Temperature ° C. | Structure Grain size number No. | strength YS MPa | strength TS MPa | Toughness vE100 ° C. | cracking resistance Evaluation |
| 1 | 900 | 60 | 655 | 6.8 | 472 | 610 | −43 | Excellent |
| 2 | 910 | 60 | 655 | 6.5 | 474 | 615 | −43 | Good |
| 3 | 920 | 60 | 655 | 6.0 | 478 | 620 | −44 | Good |
| 4 | 930 | 60 | 655 | 5.5 | 480 | 626 | −51 | Good |
| 5 | 940 | 60 | 655 | 5.0 | 483 | 630 | −53 | Good |
| 6 | 990 | 20 | 655 | 4.5 | 463 | 620 | −35 | Good |
| 7 | 940 | 20 | 655 | 5.0 | 460 | 615 | −32 | Good |
| 8 | 930 | 20 | 655 | 5.5 | 457 | 610 | −30 | Good |
| 9 | 920 | 20 | 655 | 6.0 | 455 | 605 | −37 | Excellent |
| 10 | 900 | 20 | 655 | 6.5 | 451 | 600 | −38 | Excellent |
| 11 | 900 | 60 | 640 | 6.8 | 522 | 665 | −21 | Excellent |
| 12 | 910 | 60 | 640 | 6.5 | 524 | 670 | −20 | Good |
| 13 | 920 | 60 | 640 | 6.0 | 525 | 675 | −22 | Good |
| 14 | 930 | 60 | 640 | 5.5 | 525 | 677 | −29 | Good |
| 15 | 940 | 60 | 640 | 5.0 | 527 | 680 | −31 | Good |
| 16 | 990 | 20 | 640 | 4.5 | 517 | 670 | −17 | Good |
| 17 | 940 | 20 | 640 | 5.0 | 515 | 667 | −15 | Good |
| 18 | 930 | 20 | 640 | 5.5 | 514 | 662 | −13 | Good |
| 19 | 920 | 20 | 640 | 6.0 | 513 | 660 | −25 | Excellent |
| 20 | 900 | 20 | 640 | 6.5 | 512 | 655 | −16 | Excellent |
| 21 | 900 | 20 | 640 | 7.0 | 533 | 675 | −25 | Good |
| 22 | 900 | 20 | 640 | 7.0 | 525 | 667 | −24 | Good |
| 23 | 900 | 20 | 640 | 6.7 | 527 | 673 | −21 | Good |
| 24 | 900 | 20 | 640 | 6.8 | 523 | 666 | −20 | Good |

TABLE 4

| | Manufacturing method | | | | | | | |
|---|---|---|---|---|---|---|---|---|
| | Quenching | | | | Yield | Tensile | | Hydrogen |
| No. | Heating temperature ° C. | Cooling rate ° C./min | Tempering Temperature ° C. | Structure Grain size number No. | strength YS MPa | strength TS MPa | Toughness vE100 ° C. | cracking resistance Evaluation |
| 31 | 900 | 20 | 640 | 6.8 | 394 | 525 | 0 | Good |
| 32 | 900 | 20 | 640 | 6.5 | 535 | 713 | 15 | Good |
| 33 | 900 | 20 | 640 | 6.5 | 401 | 535 | 0 | Good |
| 34 | 900 | 20 | 640 | 6.5 | 484 | 645 | 10 | Good |
| 35 | 900 | 20 | 640 | 6.5 | 398 | 530 | 0 | Good |
| 36 | 900 | 20 | 640 | 6.5 | 500 | 666 | 15 | Good |
| 37 | 900 | 20 | 640 | 6.5 | 452 | 603 | 5 | Good |
| 38 | 900 | 20 | 640 | 6.5 | 451 | 601 | 25 | Fair |
| 39 | 900 | 20 | 640 | 6.5 | 451 | 601 | 25 | Poor |
| 40 | 900 | 20 | 640 | 6.5 | 469 | 625 | 0 | Good |
| 41 | 900 | 20 | 640 | 6.5 | 405 | 540 | 0 | Good |
| 42 | 900 | 20 | 640 | 6.5 | 476 | 635 | 10 | Good |

TABLE 4-continued

|  | Manufacturing method | | | | | | | |
|---|---|---|---|---|---|---|---|---|
|  | Quenching | | | | Yield | Tensile | | Hydrogen |
| No. | Heating temperature ° C. | Cooling rate ° C./min | Tempering Temperature ° C. | Structure Grain size number No. | strength YS MPa | strength TS MPa | Toughness vE100 ° C. | cracking resistance Evaluation |
| 43 | 900 | 20 | 640 | 6.5 | 401 | 535 | 0 | Good |
| 44 | 900 | 20 | 640 | 6.5 | 473 | 631 | 15 | Good |
| 45 | 900 | 20 | 640 | 6.5 | 405 | 540 | 0 | Good |
| 46 | 900 | 20 | 640 | 6.5 | 489 | 652 | 5 | Good |
| 47 | 900 | 20 | 640 | 6.5 | 476 | 635 | 15 | Good |
| 48 | 900 | 20 | 640 | 6.5 | 454 | 605 | 5 | Good |
| 49 | 900 | 20 | 640 | 6.5 | 452 | 603 | 0 | Good |
| 50 | 900 | 20 | 640 | 6.5 | 452 | 602 | 0 | Good |
| 51 | 900 | 20 | 640 | 6.5 | 446 | 595 | 5 | Good |
| 52 | 900 | 20 | 640 | 6.5 | 452 | 603 | 0 | Good |
| 53 | 900 | 20 | 640 | 6.5 | 491 | 655 | 15 | Good |
| 54 | 900 | 20 | 640 | 6.5 | 476 | 635 | 10 | Good |
| 55 | 900 | 20 | 640 | 6.5 | 506 | 675 | 10 | Good |
| 56 | 900 | 20 | 640 | 6.5 | 452 | 602 | 0 | Good |
| 57 | 870 | 20 | 640 | 7.2 | 439 | 585 | 5 | Good |
| 58 | 840 | 20 | 640 | 7.6 | 431 | 575 | 10 | Good |
| 59 | 1000 | 20 | 640 | 4.3 | 456 | 608 | 5 | Good |
| 60 | 1200 | 20 | 640 | 4.1 | 462 | 616 | 5 | Good |
| 61 | 870 | 20 | 640 | 7.2 | 440 | 586 | 30 | Poor |
| 62 | 1000 | 20 | 640 | 4.2 | 457 | 609 | 30 | Poor |

Forged steels of Samples Nos. 1 to 24 were inventive examples satisfying conditions specified in the present invention and had chemical compositions and metal structure grain sizes falling in appropriate ranges. The forged steels were thereby satisfactory in all the strength, toughness, and hydrogen cracking resistance as demonstrated by the test results.

By contrast, forged steels of Samples Nos. 31 to 62 were comparative examples not satisfying the condition(s) specified in the present invention in at least one of the chemical compositions and the metal structure grain size. These forged steels thereby failed to satisfy the criteria in at least one of the strength, toughness, and hydrogen cracking resistance.

TABLE 5

| No. | C | Si | Mn | P | S | Cu | Ni | Cr | Mo | V | Al | N | O | Nb | Ti | B | Ca | Al/N |
|---|---|---|---|---|---|---|---|---|---|---|---|---|---|---|---|---|---|---|
| A1 | 0.18 | 0.24 | 1.40 | 0.007 | 0.0003 | 0.02 | 0.80 | 0.12 | 0.49 |  | 0.016 | 0.0060 | 0.0024 |  |  |  |  | 2.67 |
| A2 | 0.18 | 0.24 | 1.40 | 0.007 | 0.0005 |  | 0.80 | 0.12 | 0.49 | 0.005 | 0.017 | 0.0067 | 0.0020 |  |  |  |  | 2.54 |
| A3 | 0.19 | 0.25 | 1.36 | 0.006 | 0.0003 |  | 0.80 | 0.12 | 0.49 |  | 0.016 | 0.0073 | 0.0022 |  |  |  |  | 2.19 |
| A4 | 0.18 | 0.24 | 1.42 | 0.007 | 0.0006 | 0.04 | 0.80 | 0.12 | 0.49 | 0.005 | 0.018 | 0.0060 | 0.0020 |  |  |  |  | 3.00 |
| B1 | 0.20 | 0.26 | 1.42 | 0.009 | 0.0003 | 0.03 | 0.96 | 0.22 | 0.54 | 0.005 | 0.016 | 0.0060 | 0.0024 |  |  |  |  | 2.67 |
| B2 | 0.21 | 0.26 | 1.42 | 0.008 | 0.0007 |  | 0.96 | 0.22 | 0.54 |  | 0.018 | 0.0078 | 0.0020 |  |  |  |  | 2.31 |
| B3 | 0.20 | 0.23 | 1.38 | 0.009 | 0.0005 | 0.03 | 0.96 | 0.22 | 0.54 | 0.005 | 0.016 | 0.0060 | 0.0021 |  |  |  |  | 2.67 |
| B4 | 0.20 | 0.26 | 1.44 | 0.006 | 0.0004 |  | 0.96 | 0.22 | 0.54 | 0.005 | 0.019 | 0.0080 | 0.0020 |  |  |  |  | 2.38 |

TABLE 6

|  | Manufacturing method | | | | | | | | | |
|---|---|---|---|---|---|---|---|---|---|---|
|  | Quenching | | Tempering | | | | Yield | Tensile | | Hydrogen |
|  | Heating | Cooling | | Holding | Structure | | strength | strength | Toughness | cracking |
| No. | temperature ° C. | rate ° C./min | Temperature ° C. | time hr | Grain size number No. | Cementite μm | YS MPa | TS MPa | vE100 ° C. | resistance Evaluation |
| A1 | 900 | 20 | 655 | 10.5 | 6.5 | 0.40 | 451 | 600 | −28 | Excellent |
| A2 | 900 | 20 | 655 | 5.5 | 6.8 | 0.25 | 470 | 620 | −32 | Excellent |
| A3 | 900 | 20 | 655 | 7 | 6.8 | 0.30 | 463 | 613 | −31 | Excellent |
| A4 | 900 | 20 | 655 | 9 | 6.8 | 0.35 | 456 | 606 | −30 | Excellent |
| B1 | 900 | 20 | 640 | 12 | 6.5 | 0.35 | 512 | 655 | −11 | Excellent |
| B2 | 900 | 20 | 640 | 7 | 6.8 | 0.20 | 522 | 665 | −15 | Excellent |
| B3 | 900 | 20 | 640 | 8.5 | 6.8 | 0.25 | 519 | 662 | −14 | Excellent |
| B4 | 900 | 20 | 640 | 10 | 6.8 | 0.30 | 515 | 658 | −13 | Excellent |

Tables 5 and 6 indicate the results of the other experimental example to study how the tempering time affects. The results demonstrate as follows. Samples A2 to A4 and B2 to B4 underwent tempering for shorter durations and had better balance between strength and toughness than Samples A1 and B1, respectively. Samples A1 and B1 underwent tempering for durations of longer than 10 hours as in customary techniques.

While the present invention has been described in detail with reference to preferred embodiments thereof with a certain degree of particularity, it will be understood by those skilled in the art that various changes and modifications are possible without departing from the spirit and scope of the invention.

The present application is based on Japanese Patent Application No. 2011-038074 filed on Feb. 24, 2011; and Japanese Patent Application No. 2012-018488 filed on Jan. 31, 2012, the entire contents of which are incorporated herein by reference.

INDUSTRIAL APPLICABILITY

Forged steels for components for nuclear power plants according to embodiments of the present invention are useful as members for constituting equipment such as pressure vessels and steam generators in nuclear power facilities.

REFERENCE SIGNS LIST 1 specimen
2 test equipment
3 aqueous solution containing 0.5 Mol/L $H_2SO_4$ and 0.01 Mol/L KSCN

The invention claimed is:

1. A forged steel, comprising:
C in a content of from 0.15% to 0.24%;
Si in a content of from 0.15% to 0.30%;
Mn in a content of from 1.0% to 1.6%;
P in a content of from greater than 0% to 0.015%;
S in a content of from greater than 0% to 0.0015%;
Cu in a content of from 0% to 0.10%;
Ni in a content of from 0.70% to 1.10%;
Cr in a content of from 0.05% to 0.30%;
Mo in a content of from 0.40% to 0.60%;
V in a content of from 0% to 0.05%;
Al in a content of from 0.015% to 0.030%;
O in a content of from greater than 0% to 0.0030%; and
N in a content of from 0.0050% to 0.0150%,
in mass percent,
wherein
the forged steel further comprises iron and inevitable impurities, and
a metal structure of the forged steel has a grain size in terms of ASTM grain size number of from 4.5 to 7.0.

2. The forged steel of claim 1, wherein
the content of N is 0.0100% or more in mass percent when a mass ratio (Al/N) of the content of Al to the content of N is 1.93 or more, and
the content of Al is 0.022% or more in mass percent when the mass ratio (Al/N) is less than 1.93.

3. The forged steel of claim 1, wherein
the forged steel has a large size, and
cementite present in the metal structure of the forged steel has an average equivalent circle diameter of 0.5 μm or less.

4. The forged steel of claim 1, further comprising at least one element selected from the group consisting of:
Nb in a content of from 0.005% to 0.050%;
Ti in a content of from 0.005% to 0.030%;
B in a content of from 0.0005% to 0.0050%; and
Ca in a content of from 0.0005% to 0.0050%,
in mass percent.

5. A welded structure, obtained by a process comprising:
preparing two or more forgings of the forged steel of claim 1; and
welding the two or more forgings with each other.

6. The forged steel of claim 2, wherein
the forged steel has a large size, and
cementite present in the metal structure of the forged steel has an average equivalent circle diameter of 0.5 μm or less.

7. The forged steel of claim 2, further comprising at least one element selected from the group consisting of:
Nb in a content of from 0.005% to 0.050%;
Ti in a content of from 0.005% to 0.030%;
B in a content of from 0.0005% to 0.0050%; and
Ca in a content of from 0.0005% to 0.0050%,
in mass percent.

8. The forged steel of claim 3, further comprising at least one element selected from the group consisting of:
Nb in a content of from 0.005% to 0.050%;
Ti in a content of from 0.005% to 0.030%;
B in a content of from 0.0005% to 0.0050%; and
Ca in a content of from 0.0005% to 0.0050%,
in mass percent.

9. A welded structure, obtained by a process comprising:
preparing two or more forgings of the forged steel of claim 2; and
welding the two or more forgings with each other.

10. A welded structure, obtained by a process comprising:
preparing two or more forgings of the forged steel of claim 3; and
welding the two or more forgings with each other.

11. A welded structure, obtained by a process comprising:
preparing two or more forgings of the forged steel of claim 4; and
welding the two or more forgings with each other.

* * * * *